Patented Dec. 12, 1939

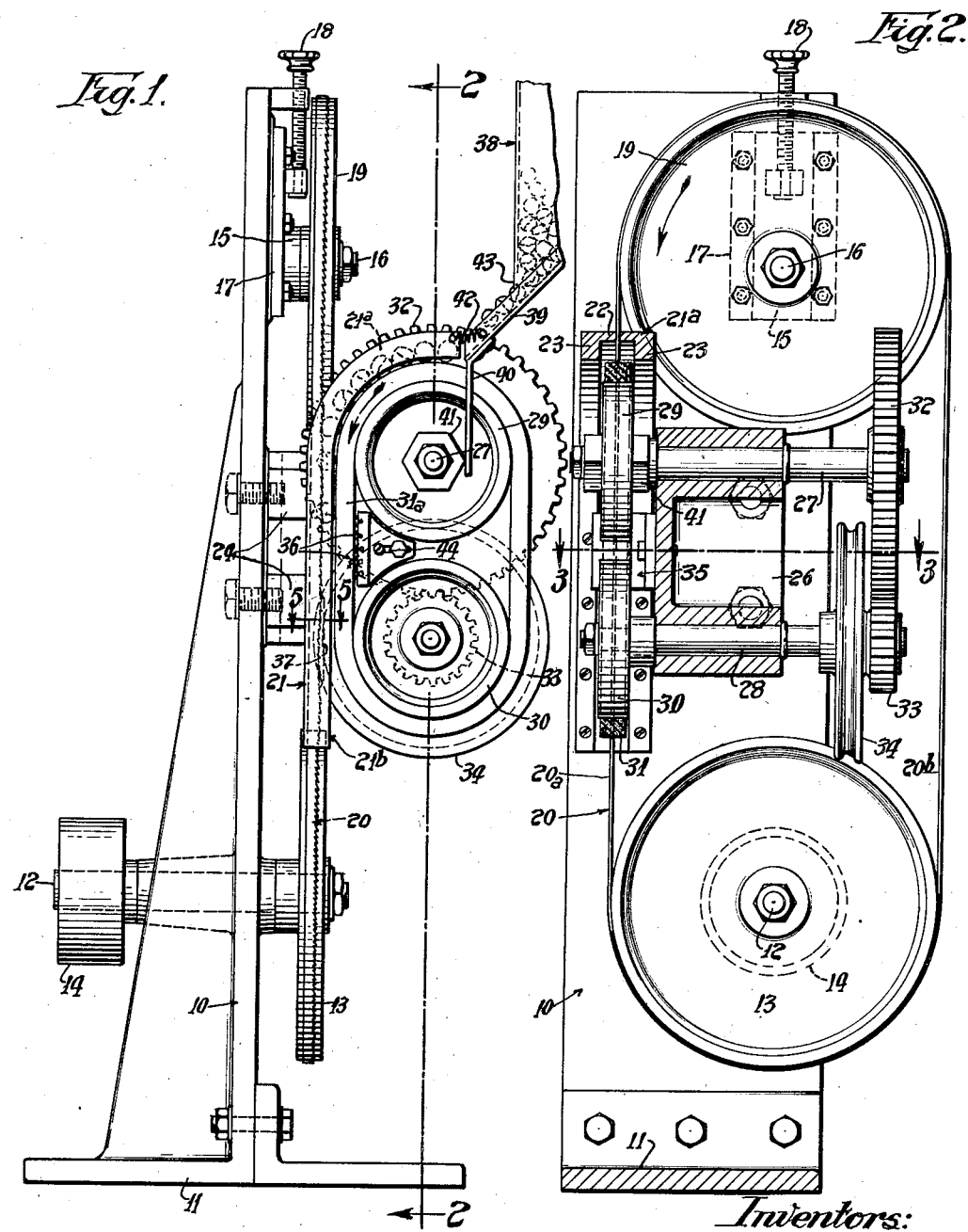

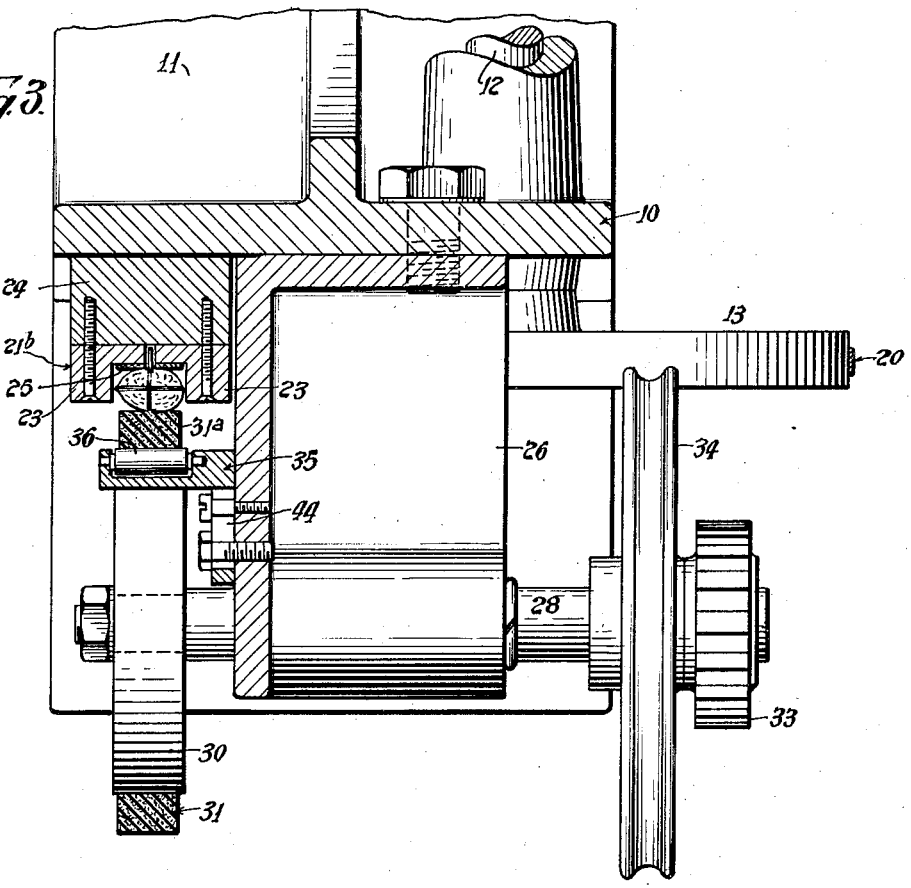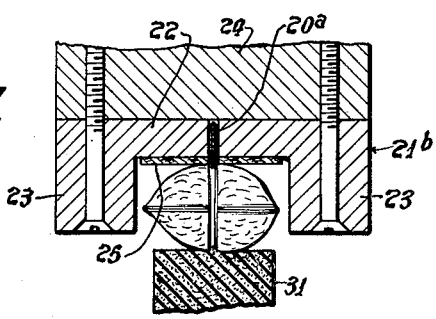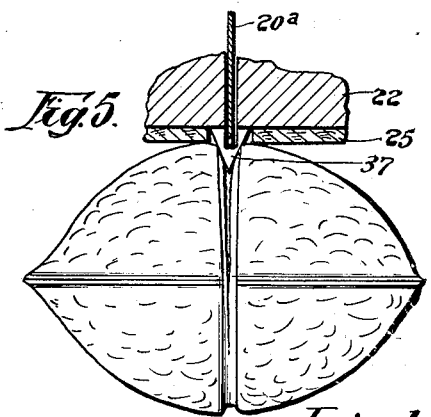

2,183,080

UNITED STATES PATENT OFFICE 2,183,080

MACHINE FOR OPERATING UPON NUTS

Alfred J. Lloyd and Cyrus W. Lloyd, Orillia, Ontario, Canada

Application February 10, 1937, Serial No. 125,020

15 Claims. (Cl. 146—10)

This invention relates to improvements in methods of and machines for operating upon nuts and it consists of the matters hereinafter described and more particularly pointed out in the appended claims.

One of the objects of the invention is to provide an improved method of operating upon nuts to open the shells thereof in such manner that the kernels remain whole, to a considerable extent.

A further object of the invention is to provide an improved method of operating upon nuts wherein the shells are cut circumferentially into two parts which are separated laterally to such an extent that they only loosely adhere to the kernel or are separated therefrom according to the condition of the nut operated upon.

A further object of the invention is to provide a method of this kind which is fast and positive and which may be carried out with a simple machine.

Another object of the invention is to provide a fast, simple and efficient machine for cutting through the shell of a nut circumferentially and then separating the parts of the shell so that the shell parts are entirely freed from the kernel, or are so loosened from the kernel as to be easily removed therefrom by hand or otherwise.

The above mentioned objects of the invention, as well as others, together with the several advantages thereof will more fully appear as the specification proceeds.

In the drawings:

Fig. 1 is a view in side elevation of a machine embodying the preferred form of the invention for operating upon nuts in accordance with the improved method.

Fig. 2 is a vertical sectional view through the same as taken on the line 2—2 of Fig. 1, the nuts being omitted for clarity.

Fig. 3 is a horizontal detail sectional view through a part of the improved machine, on an enlarged scale, as taken on the line 3—3 of Fig. 2.

Fig. 4 is a detail horizontal sectional view on a further enlarged scale of parts appearing in Fig. 3 and which will be more fully referred to later.

Fig. 5 is another detail horizontal sectional view through a part of the improved machine on still a further enlarged scale as taken on the line 5—5 of Fig. 1.

Referring now in detail to that embodiment of the invention illustrated in the accompanying drawings, 10 indicates as a whole the frame of the machine, which is in the form of an upright standard having a horizontal base 11 whereby the machine may be secured upon a suitable support. A horizontal shaft 12 is journalled in and extends transversely through the standard near its bottom end and on said shaft, at the front side of the standard, is fixed a band wheel 13. Also on said shaft, at the rear side of said standard, is secured a pulley 14 whereby the shaft may be driven from any suitable source of power.

On the front side of the standard, toward the top end thereof, a block 15 is provided, carrying a stub shaft 16. This block is mounted between suitable guides 17 for vertical adjustment on the standard and which adjustment is provided by a hand screw 18 carried at the top end of the standard. A band wheel 19, similar to the one 13 before mentioned, is journalled on the stub shaft 16 and an endless saw band 20 is trained about both wheels 13 and 19. It is apparent that when the shaft 12 is being driven, the wheels 13 and 19 drive the saw band in the direction of the arrow in Fig. 2, one lap 20a travelling downwardly and the other lap travelling upwardly. The saw band may be tensioned by means of the hand screw 18.

Spaced forwardly from the standard and associated with the downwardly travelling lap 20a of the saw band, is a nut track or channel 21. This track or channel embodies an elongated plate member 22 with side rails 23. The top part 21a of said track curves upwardly and forwardly and is about 90° in extent. The remainder 21b of said track is straight and parallel with the front face of the standard and is spaced therefrom by a pair of blocks 24. The front face of the plate member 22 of the track between the said rails has a relatively yielding friction face 25. A strip of cork amply serves the purpose. In the median line of the straight part 21b of said plate member and the friction face thereon, is a slit or kerf for the reception of that part of the saw band lap 20a running therethrough, the cutting edge of said band projecting a suitable distance beyond the friction face 25. Preferably said cutting edge is a toothed edge.

A bracket 26 projects forwardly from the front face of the standard, preferably to the right hand side of the lap 20a of the saw band. In this bracket are journalled top and bottom horizontal shafts 27 and 28 respectively, the axis of the shaft 27 being coincident with the axis of the curved top part 21a of the track or channel 21. On the left hand end of said shafts are pulleys or wheels 29 and 30 respectively arranged in the edgewise plane of lap 20a of the saw band at this point.

An endless belt 31 is trained about said wheels. This belt, as shown, is preferably narrower than the facing strip 25 of the track 21 and the face of this belt is spaced closely adjacent the face of the rails 23 of said track. The endless belt 31 is of a relatively soft friction material and a belt of sponge rubber with a textile backing strip running on the faces of the wheels 29 and 30, makes a suitable belt for the purpose.

A spur gear 32 is fixed to that end of the shaft 27 opposite the pulley or wheel 29 and this gear meshes with a pinion 33 loose on that end of the shaft 28 opposite the pulley or wheel 30. Also loose on the said end of the shaft 28, but secured to the pinion 33 is a pulley 34 which may be driven from any suitable source of power. When the pulley 34 is driven, the shaft 27 is driven at a slower speed through the pinion 33 and gear 32 and the shaft 28 is driven at the same speed and in the same direction as the shaft 27, through the endless belt 31. The speed of the belt 31 is slower than that of the saw band and that lap 31a of the belt 31 adjacent the track travels in the same direction as, but at a slower speed than that of the associated lap 20a of the saw band.

On one side of the bracket 26 between the pulleys or wheels 29 and 30 is an angle bracket 35 carrying horizontally arranged, antifriction rollers 36 over which a part of the lap 31a of the belt 31 travels, so that said part of the belt lap has a substantial pressure resisting backing, for a purpose soon to appear. The angle bracket 35 has a pin and slot connection 44 with the bracket 26 whereby the rollers 36 may be adjusted toward or away from the back of the belt lap 31a.

On the front face of that part of plate 22, about in the horizontal plane of the shaft 28, and in line with and extending parallel with the saw band lap 20a at this point, is a V shaped rib 37. The ridge of this rib is disposed a suitable distance beyond the face of the friction strip 25 and extending partway through the depth of said rib is a slit or kerf to accommodate the cutting edge of the saw band as best shown in Fig. 5. The purpose of the rib will soon appear.

Unshelled nuts are fed, by hand or otherwise, into the space between the top surface of the belt 31 where it passes over the top of the wheel 29 and the bottom surface of the facing strip 25 on the end 21a of the track 21. As shown herein, a hopper 38 is provided to hold a supply of unshelled nuts and an inclined chute 39 of channel cross section leads from the hopper into the space before mentioned. This hopper may be supported for a slight vibrating movement and the chute 39 may carry an arm 40 for engagement with polygonal cams 41 on the shaft 27 at opposite sides of the pulley or wheel 29. A spring 42 is arranged between the chute 39 and end 21a of the track. In the rotation of the shaft the cams 41 and spring 42 operate upon the arm 40 to impart a short in and out vibrating movement to the hopper which jiggles the same so that the nuts move out of the outlet 43 of the hopper into the chute 39. This chute directs the nuts, one at a time, as a steady stream into the space, before mentioned, between the track end 21a and top surface of the belt 31 where it passes over the top of the wheel 29. In the case of the more oval shaped nuts, such as walnuts, pecans, Brazil nuts and the like, the nuts enter said space with their longitudinal axis parallel with the axis of the shaft 27 so that said axes are transverse to the face of the belt 31.

When the nuts are in said track space, one side of the shell, of each thereof, is engaged with the facing strip 25 and the other side is engaged with the yielding face of the belt 31. Thus, the said nuts are peripherally supported and are given a rolling movement as they advance along the track or channel. As the nuts enter the straight portion of the track, they meet the cutting edge of the saw band so that the said band cuts through the shell of the nut peripherally. It is pointed out that in most instances when unshelled nuts are being cured, a shrinkage of the kernels takes place so that said kernels are somewhat loose in the shell. The cutting edge of the saw band is preferably so disposed as to cut through the shells only so as not to injure the kernels or to otherwise impair their salability. Of course, the speed of the cutting edge of the saw band is greater than that of the rolling movement of nut, but such great speed does not operate to "pull" the nut along or through the track because its movement along the track is only so fast as is permitted by the belt 31.

As the belt 31 is of a yielding character, as before described, the nut may tend to sink into the belt 31 under the action of the saw band, but this movement of the nut is limited by the backing action of the rollers 36, before described. When the nut operated upon passes below the zone in which the rollers 36 are located, the nut has turned more than once about its axis while in engagement with the saw band and this insures a complete severing of the shell peripherally. As said nut leaves the zone of the rollers 36, it is brought into engagement with the V-shaped rib 37. At this time the ridge of said rib enters the kerf or cut in the shell of the nut and operates to separate the two parts of the shell laterally. As the shell has not as yet left the track, this separation of the shell parts is limited by the engagement of the ends of the nut shell with the sides of the rails 23 of the track. Thus, the nuts, with their completely severed shells, which have been further loosened from the kernels by the separation of the shell parts, fall from the machine into a suitable receiver (not shown) resting upon the support, on which the machine is mounted.

In most cases, and especially when operating upon walnuts, the separated shell parts fall free from the nuts when they drop into the receiver mentioned. It is pointed out that in nuts having kernels arranged as lobes with a membrane therebetween, the rolling action imparted to the nut serves to fracture the membrane so that it easily leaves the kernel in the separation of the shell parts. Thus, but relatively few of the kernels are broken, as the nuts with their severed and separated shells drop into the receiver. The machine, which is substantially devoid of reciprocating parts, runs continuously in one direction. Therefore, it is fast in operation and uses but a small amount of power in such operation.

While in describing the invention, we have referred in detail to the form, arrangement and construction of the parts described, as well as to the steps of operation and sequence thereof, the same is to be considered only in the illustrative sense so that we do not wish to be limited thereto except as may be specifically set forth in the appended claims.

We claim as our invention:

1. A machine of the kind described embodying therein a cutting element, a shell part separating means, and means providing opposed surfaces between which a nut is engaged, one of said surfaces being movable and formed by one lap of an endless belt and cooperating with said other surface to roll a nut while in engagement with and relative to said cutting element and past said shell part separating means.

2. A machine of the kind described, a power driven saw band, means providing a nut shell engaging surface through which a part of said saw band extends, an endless belt of relatively soft yielding friction material having a lap providing a second nut shell engaging surface for rolling a nut relative to the band while in engagement with said part of the saw band.

3. A machine of the kind described, a saw band, means providing a nut shell engaging surface through which a part of the saw band extends, a nut shell part separating device on said means in line with said band, an endless belt of relatively yielding material having a lap providing a second nut shell engaging surface and cooperating wth the first mentioned means for rolling a nut while in engagement with a part of the saw band and then into operative engagement with said nut shell part separating device.

4. In a machine of the kind described, means providing opposed coacting nut shell engaging surfaces forming a path along which the nuts operated upon move, one of said surfaces being a movable one and one of said surfaces embodying yielding resilient material, the nuts being accommodated between said surfaces and being moved by the movable surface along the path in the direction of the movement of the movable surface, and means positioned to operate in the path formed by said surfaces and to engage the nut opposite to the side engaged by the resilient member, said means including movable cutting portions for cutting the shell of said nuts as they move along the path past said cutting portions.

5. In a machine of the kind described, means providing opposed coacting nut shell engaging surfaces forming a path along which the nuts operated upon move, one of said surfaces being a movable one and one of said surfaces embodying yielding resilient material having the character of a relatively soft rubber, the nuts being accommodated between said surfaces and being moved by the movable surface along the path in the direction of the movement of the movable surface, and means positioned to operate in the path formed by said surfaces and to engage the nut opposite to the side engaged by the resilient member, said means including movable cutting portions for cutting the shell of said nuts as they move along the path past said cutting portions.

6. In a machine of the kind described, means providing opposed coacting nut shell engaging surfaces forming a path along which the nuts operated upon move, one of said surfaces being in the form of a part of a movable endless belt of resilient material, the nuts being accommodated between said surfaces and being moved by the movable surface along the path in the direction of the movement of said part of said movable endless belt, and means positioned to operate in the path formed by said surfaces and to engage the nut opposite to the side engaged by the resilient belt, said means including movable cutting portions for cutting the shell of said nuts as they move along the path past said cutting portions.

7. In a machine of the kind described, means providing opposed coacting nut shell engaging surfaces forming a path along which the nuts operated upon move, one of said surfaces being stationary and one of said surfaces being movable and embodying a resilient material, the nuts being accommodated between said surfaces and being rolled peripherally along said path against said stationary surface in the direction of the movement of the movable surface, and means positioned to operate in the path formed by said surfaces and to engage the nut opposite to the side engaged by the resilient member, said means including movable cutting portions for cutting the shell of said nuts as they move along the path past said cutting portions.

8. In a machine of the kind described, means providing opposed coacting nut shell engaging surfaces forming a path along which the nuts operated upon move, one of said surfaces being stationary and one of said surfaces being formed by a part of a movable endless belt embodying a resilient material, the nuts being accommodated between said surfaces and being rolled peripherally along said path against said stationary surface in the direction of the movement of said part of said belt, and means positioned to operate in the path formed by said surfaces and to engage the nut opposite to the side engaged by the resilient member, said means including movable cutting portions for cutting the shell of said nuts as they move along the path past said cutting portions.

9. In a machine of the kind described, means providing opposed coacting nut shell engaging surfaces forming a path along which the nuts operated upon move, one of said surfaces being a movable one and one of said surfaces embodying resilient material, the nuts being accommodated between said surfaces and being moved by the movable surface along the path in the direction of the movement of the movable surface, and a power driven saw having a part positioned to operate in the path formed by said surfaces to engage the nut opposite to the side engaged by the resilient member for cutting the shell of said nuts as they move along the path past said part of the power driven saw.

10. In a machine of the kind described, means providing opposed coacting nut shell engaging surfaces forming a path along which the nuts operated upon move, one of said surfaces being a movable one and one of said surfaces embodying resilient material having the character of relatively soft rubber, the nuts being accommodated between said surfaces and being moved by the movable surface along the path in the direction of the movement of the movable surface, and a power driven saw having a part positioned to operate in the path formed by said surfaces and to engage the nut opposite to the side engaged by the resilient member for cutting the shell of said nuts as they move along the path past said part of the power driven saw.

11. In a machine of the kind described, means providing opposed coacting nut shell engaging surfaces forming a path along which the nuts operated upon move, one of said surfaces being movable and one of said surfaces embodying resilient material, the nuts being accommodated between said surfaces and being moved by the movable surface along the path in the direction of the movement of the movable surface, and means including a movable cutting portion positioned at a point in said path and having a part opening through one of said surfaces to engage the nut opposite to the side engaged by the resilient member for cutting the shell of said nuts as they move along the path past said cutting portions.

12. In a machine of the kind described, means providing opposed coacting nut shell engaging surfaces forming a path along which the nuts operated upon move, one of said surfaces having a longitudinal slit therein, the other of said surfaces being a resilient one and having movement in the direction longitudinally of said slit, the nuts being accommodated between said surfaces and being moved in the path in the direction of the movement of said movable surface and a power driven saw having a moving part extending through said slit into said path to engage the nut opposite to the side engaged by the resilient surface, said nuts being moved at a different speed from that of said saw part into and past an operative position with respect to said moving part of said saw.

13. In a machine of the kind described, means providing a stationary surface having an opening therein, an endless movable belt having a continuous nut shell engaging surface embodying a resilient material coacting with the first mentioned stationary surface in providing a path along which the nuts to be operated upon move, and means associated with said surfaces and having a movable part extending through said opening in the stationary surface to engage the nut opposite to the side engaged by the resilient member for cutting the shells of the nuts, said nuts being retained in and moved along the path into and past an operative position with respect to said nut shell cutting means.

14. In a machine of the kind described, means providing a relatively straight stationary surface having a longitudinal slit therein, means providing a movable surface embodying a resilient material arranged adjacent to the first mentioned surface and coacting therewith in providing a path of movement for the nuts to be operated upon and in which said nuts are retained and along which said nuts are moved, and a power driven saw band having a part disposed in the slit in the stationary surface to engage the nut opposite to the side engaged by the resilient member for cutting the shell of said nuts as they move along the path.

15. In a machine of the kind described, means providing an endless belt of resilient material and a plurality of pulleys about which said belt is trained, means providing a second and stationary surface arranged adjacent to a part of said belt and having a part following about a part of one of said pulleys so as to coact with the first mentioned surface in providing a path of movement for the nuts to be operated upon having an inlet end and a movable saw element arranged in a slit in said stationary surface to engage the nut opposite to the side engaged by the resilient member for cutting the shells of said nuts as said nuts are retained in and moved along said path of movement by the part of said belt into and past operative position with respect to said saw element.

ALFRED J. LLOYD.
CYRUS W. LLOYD.